United States Patent [19]
Nakano

[11] Patent Number: 6,144,313
[45] Date of Patent: Nov. 7, 2000

[54] PAGER AND METHOD FOR OPERATING SAME

[75] Inventor: Yasushi Nakano, Shizuoka, Japan

[73] Assignee: NEC Corporation, Tokyo, Japan

[21] Appl. No.: 08/976,872

[22] Filed: Nov. 24, 1997

[30] Foreign Application Priority Data

Nov. 26, 1996 [JP] Japan .................................. 8-314418

[51] Int. Cl.[7] .................................................. G08B 5/22
[52] U.S. Cl. ..................... 340/825.44; 379/51; 455/31.3; 455/38.1; 455/412
[58] Field of Search ......................... 340/825.44, 825.69, 340/825.72; 455/31.3, 31.2, 38.1, 38.5, 412; 379/40, 51

[56] References Cited

U.S. PATENT DOCUMENTS

| 5,099,507 | 3/1992 | Mukai et al. | 379/57 |
| 5,459,458 | 10/1995 | Richardson et al. | 340/825.52 |
| 5,577,046 | 11/1996 | Diachina et al. | 370/95.2 |
| 5,596,318 | 1/1997 | Mitchell | 340/825.44 |
| 5,630,207 | 5/1997 | Gitlin et al. | 455/54.1 |
| 5,758,280 | 5/1998 | Kimura | 455/412 |
| 5,850,594 | 4/1999 | Cannon et al. | 455/31.3 |
| 5,894,506 | 4/1999 | Pinter | 379/88.23 |

FOREIGN PATENT DOCUMENTS 7-7287  1/1995  Japan .

*Primary Examiner*—Michael Horabik
*Assistant Examiner*—Anthony A. Asongwed
*Attorney, Agent, or Firm*—Ostrolenk, Faber, Gerb & Soffen, LLP

[57] ABSTRACT

A pager having a telephone number memory, a telephone number retrieval section, a radio transmitter section, and a reply operation control section, which makes it possible to automatically send a reply message back to the sender of a message to the pager, without requiring a complex operation to be performed by the user of the pager. The telephone number memory stores information including telephone numbers of other pagers. The telephone number retrieval section executes retrieval of a telephone number out of the telephone numbers stored in the telephone number memory, in response to a sequence of numbers which is included in the received message. The reply operation control section controls transmission of a reply message to the telephone number which has been determined by the telephone number retrieval section, using the radio transmitter section. With the pager, it is possible to automatically let the sender know that the message has been received by the pager even in situations where dialing and talking are impossible, and telephone charges for the reply messages can be saved since the reply operation is executed accurately and quickly.

20 Claims, 12 Drawing Sheets

PAGER AND METHOD FOR OPERATING SAME

BACKGROUND OF THE INVENTION

The present invention generally relates to a pager and a method for operating a pager, and in particular, to a pager and a method for operating a pager by which sending a reply message back to the sender is made possible.

Description of the Related Art

Various kinds of pagers for receiving radio calling or radio paging via a radio paging service are on the market and the number of subscribers of the radio paging service is remarkably increasing. These days, many of the pagers are provided with functions for receiving and displaying messages which is sent from the caller or the sender. A radio calling signal or a radio paging signal which is including the message from the sender is transmitted by the radio paging service, and the pager receives the radio calling signal and displays the message included in the signal. The types of characters which can be displayed by a pager depends on the pager, and increasing number of pagers are provided with functions for displaying characters other than numbers, such as alphabets, symbols, etc.

However, the conventional pagers are terminal units which are designed for receiving messages only and are not provided with functions for replying, and thus, in order to let the sender of the message know that the message has been correctly received, the recipient of the message is forced to make contact with the sender by giving the sender a phone call from public telephones or portable telephones, or by sending a reply message via a radio paging service by dialing a telephone number of a pager of the sender from public telephones or portable telephones, etc.

Meanwhile, a terminal unit which includes a portable telephone for sending messages only and has functions for receiving messages via a radio paging service and displaying the message, has been disclosed in Japanese Utility Model Application Laid-Open No.HEI7-7287. With this kind of terminal unit, the user of the terminal unit who has received a paging message from a sender can dial the correct telephone number of the sender by looking at the telephone number in the message which is displayed on an LCD etc. of the terminal unit, and inform the sender of reception of the message.

However, with this type of terminal unit, in order to let the sender know about reception of the message, the user of the terminal unit is required to operate the terminal unit and dial the telephone number of the sender and tell the sender that the message has been correctly received. Therefore, in situations where dialing and talking are impossible, for example during a meeting etc., it is impossible to inform the sender of reception of the message.

Further, with this type of terminal unit, during the dialing operation by the user, the user may push the wrong buttons or take a considerably long time for inputting a reply message. Therefore, a lot of extra telephone charges may be needed with this type of terminal unit.

SUMMARY OF THE INVENTION

It is therefore the primary object of the present invention to provide a pager by which it is possible to automatically send a reply message back to the sender of a message to the pager without requiring the user to perform a complex operation by the user to the pager.

Another object of the present invention is to provide a pager by which the reply message can be automatically sent back to the sender only when the reply is necessary.

In accordance with an aspect of the present invention, there is provided a pager comprising a receiver means, an informing means, a display means, a telephone number storing means, a telephone number retrieval means, a radio transmitter means, and a reply operation control means. The receiver means receives radio calling signals. The informing means informs the user of reception of the radio calling signal to the pager itself. The display means displays a received message which is extracted from the radio calling signal. The telephone number storing means stores information including telephone numbers of other pagers which have been previously inputted by the user. The telephone number retrieval means executes retrieval of a telephone number out of the telephone numbers which have been stored in the telephone number storing means, by a sequence of numbers which is included in the received message. The radio transmitter means executes radio transmission. And the reply operation control means controls transmission of a reply message to the telephone number which has been determined by the telephone number retrieval means, using the radio transmitter means.

Preferably, the pager further comprises a sender reply flag checking means for checking whether or not a sender reply flag requesting the reply message is included in the received message. In such a preferred embodiment, the transmission of the reply message is executed if the sender reply flag is included in the received message.

Preferably, the pager further comprises a user reply flag checking means for checking whether or not a user reply flag has been attached to the telephone number stored in the telephone number storing means. In such a preferred embodiment, the transmission of the reply message is executed if the user reply flag has been attached to the telephone number which has been determined by the telephone number retrieval means.

Preferably, a predetermined reply message is used as the reply message.

Preferably, the pager further comprises a received message clipping means for clipping part of the reply message out of the reply message. In such a preferred embodiment, the reply message is generated using the part of the reply message clipped by the received message clipping means.

Preferably, the pager further comprises a reply message editor means for being used when the user inputs and edits a reply message. In such a preferred embodiment, the reply message inputted by the user is transmitted if the reply message is inputted by the user.

Preferably, the telephone number retrieval means extracts a sequence having numbers of a predetermined number of digits out of the received message, and determines whether the sequence of numbers is the whole telephone number or part of the telephone number of the pager of the sender.

Preferably, the telephone number retrieval means executes the extraction of the sequence of numbers by finding a sequence of numbers having a predetermined number of digits which is placed at the end of the received message.

Preferably, the telephone number retrieval means extracts a sequence of numbers which follows a telephone number flag out of the received message, and determines whether the sequence of numbers is the whole telephone number or part of the telephone number of the pager of the sender.

Preferably, the telephone number retrieval means extracts a sequence of numbers which is sandwiched between telephone number flags out of the received message, and determines whether the sequence of numbers is the whole telephone number or part of the telephone number of the pager of the sender.

In accordance with another aspect of the present invention, a method for operating a pager comprises the steps of: (a) receiving radio calling signals, (b) informing the user of reception of the radio calling signal to the pager itself, and (c) displaying a received message which is extracted from the radio calling signal, and further comprises the steps of: (1) storing information in a telephone number storing means, the information including telephone numbers of other pagers which have been previously inputted by the user, (2) retrieving a telephone number out of the telephone numbers which have been stored in the telephone number storing means, by a sequence of numbers which is included in the received message, and (3) transmitting a reply message to the telephone number which has been determined in step (2), using a radio transmitter means.

Preferably, the method further comprises the step of checking whether or not a sender reply flag requesting the reply message is included in the received message. In such a preferred embodiment, the transmission of the reply message is executed if the sender reply flag is included in the received message.

Preferably, the method further comprises the step of checking whether or not a user reply flag has been attached to the telephone number stored in the telephone number storing means. In such a preferred embodiment, the transmission of the reply message is executed if the user reply flag has been attached to the telephone number which has been determined in step (2).

Preferably, a predetermined reply message is used as the reply message.

Preferably, the method further comprises the step of clipping part of the reply message out of the reply message. In such a preferred embodiment, the reply message is generated using the clipped part of the reply message.

Preferably, the method further comprises the step of letting the user input and edit a reply message. In such a preferred embodiment, the reply message inputted by the user is transmitted if the reply message is inputted by the user.

Preferably, in step (2), a sequence of numbers of a predetermined number of digits is extracted out of the received message and it is determined whether the sequence of numbers is the whole telephone number or part of the telephone number of the pager of the sender.

Preferably, the extraction of the sequence of numbers is executed by finding a sequence of numbers of a predetermined number of digits which is placed at the end of the received message.

Preferably, in step (2), a sequence of numbers which follows a telephone number flag is extracted out of the received message and it is determined whether the sequence of numbers is the whole telephone number or part of the telephone number of the pager of the sender.

Preferably, in step (2), a sequence of numbers which is sandwiched between telephone number flags is extracted out of the received message and it is determined whether the sequence of numbers is the whole telephone number or part of the telephone number of the pager of the sender.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
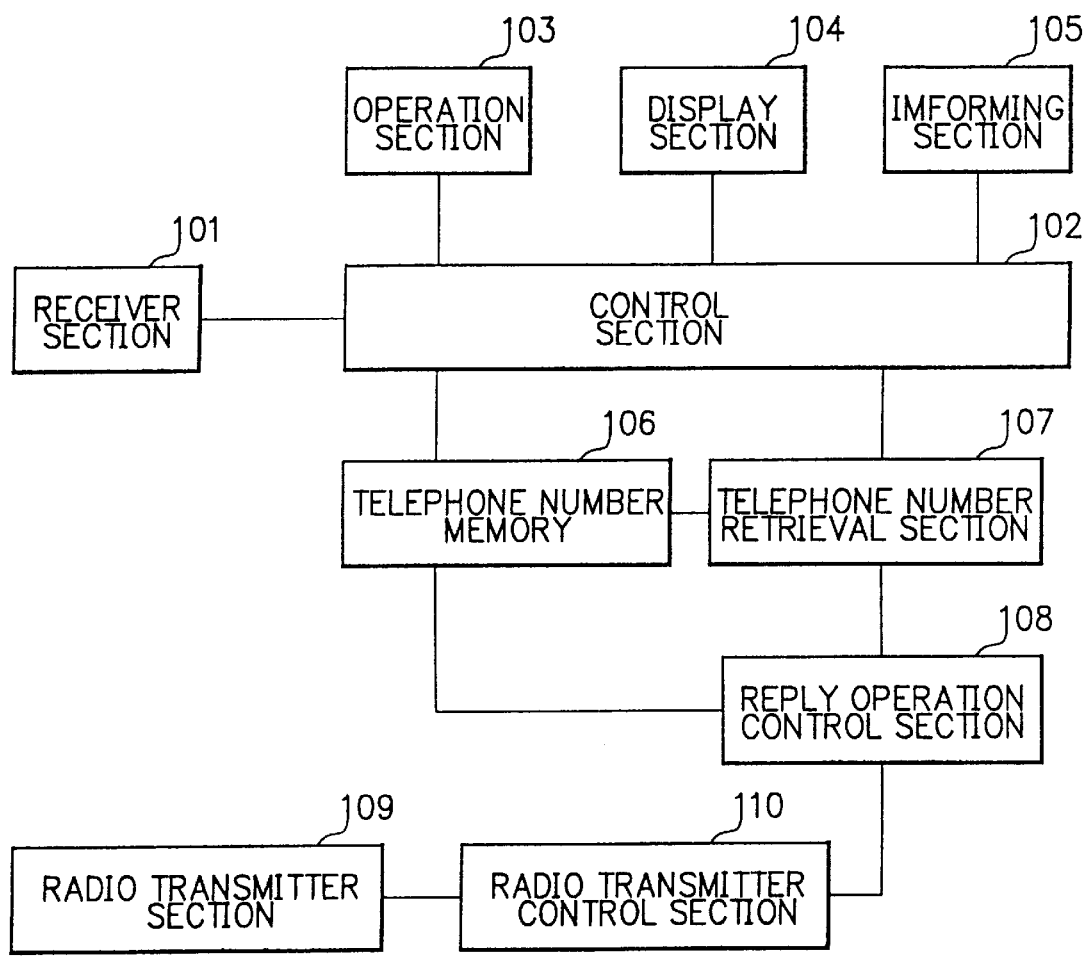
FIG. 1 is a block diagram showing functional blocks composing a pager according to an embodiment of the present invention.

Referring now to the drawings, a description will be given in detail of preferred embodiments in accordance with the present invention.

Figure 2:
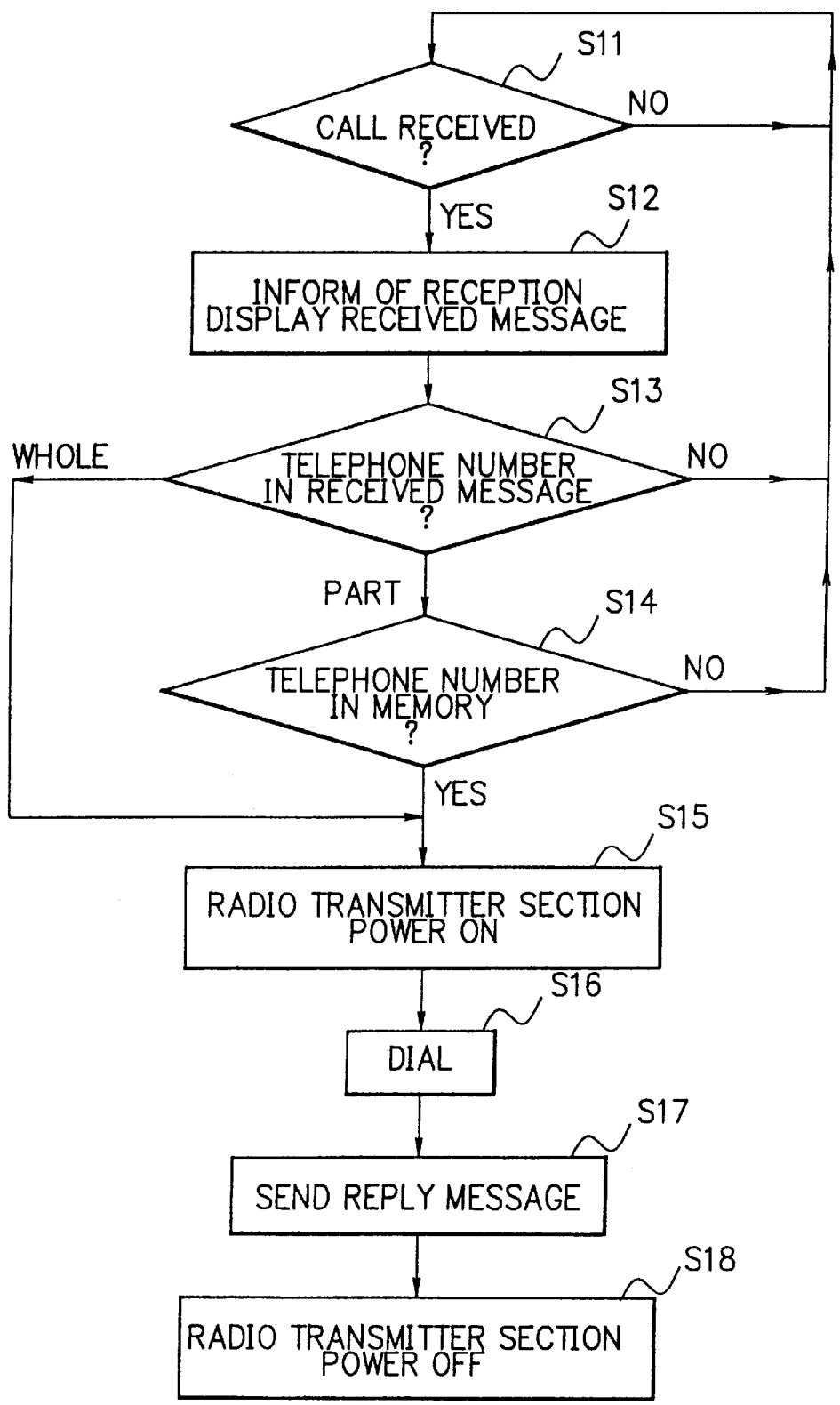
FIG. 2 is a flow chart showing steps involved in the operation of the pager of FIG. 1.

FIG. 1 is a block diagram showing functional blocks composing a pager according to an embodiment of the present invention and FIG. 2 is a flow chart showing steps involved in the operation of the pager of FIG. 1.

The pager shown in FIG. 1 comprises a receiver section 101, a control section 102, an operation section 103, a display section 104, an informing section 105, a telephone number memory 106, a telephone number retrieval section 107, a reply operation control section 108, a radio transmitter section 109, and a radio transmitter control section 110.

The receiver section 101 converts received radio paging signals or radio calling signals into digital signals, and sends the digital signals to the control section 102. The control section 102 executes identification of selective calling numbers (ID) and extraction of received messages out of the digital signals.

The operation section 103 is a block for receiving user's operation to the pager, and is composed of, for example, key switches such as scroll keys, an enter key, etc. The display section 104 is comprised of, for example, a LCD (Liquid Crystal Display) and executes display of received messages, functions of the pager, and the operation state of the pager. The informing section 105 is comprised of, for example, LEDs (Light-Emitting Diodes), a speaker, a vibrating motor, and is activated in order to inform the user of reception of calling.

The telephone number memory 106 at least stores telephone numbers of other pagers which have been inputted by the user of the pager, and may store information such as names and addresses corresponding to each telephone number. The telephone number retrieval section 107 finds and extracts a telephone number out of a received message. Or the telephone number retrieval section 107 finds and extracts a sequence of numbers corresponding to part of a telephone number out of a received message, and retrieves a telephone number which has been stored in the telephone number memory 106 by matching with the extracted sequence of numbers, and if a telephone number could be retrieved, sends the retrieved telephone number to the reply operation control section 108.

The reply operation control section 108 activates and controls the radio transmitter control section 110 in order to execute reply to a pager of the sender of the message. The radio transmitter control section 110 activates the radio transmitter section 109 and establishes communication with a radio paging service using the telephone number which has been retrieved by the telephone number retrieval section 107. Then, the reply operation control section 108 sends a predetermined or prestored reply message to the pager of the sender via the radio paging service. After the reply operation is finished, power is disconnected from the radio transmitter section 109 by the radio transmitter control section 110.

Figure 3:
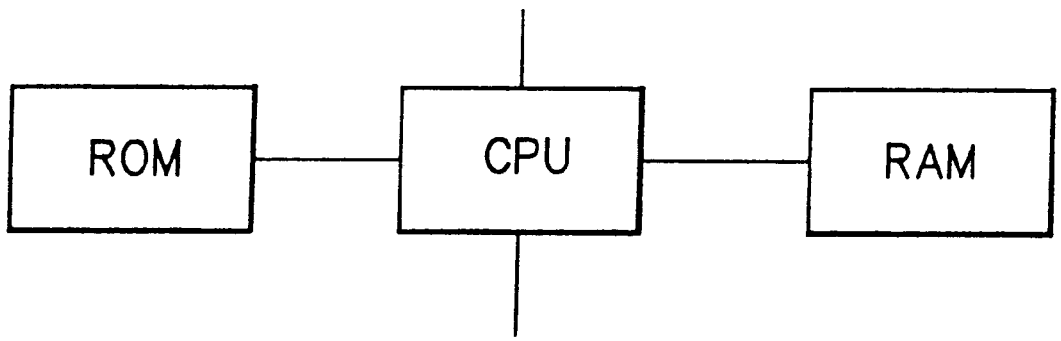
FIG. 3 is a block diagram showing composition of each functional block such as the control section, the telephone number retrieval section, the reply operation control section, and the radio transmitter control section in FIG. 1.

Incidentally, the control section 102, the telephone number retrieval section 107, the reply operation control section 108, and the radio transmitter control section 110 are realized, for example, by a microcomputer unit which is comprised of a CPU (Central Processing Unit), a ROM (Read Only Memory), a RAM (Random Access Memory) etc. as shown in FIG. 3 and necessary software. A CPU such as Z80 can be used as the CPU in FIG. 3, and a flash ROM and a SRAM (Static RAM) can be used as the ROM and the RAM in FIG. 3, respectively. As a power source of the radio transmitter section 109 for executing radio transmission, a battery such as Ni-Cd battery, which can maintain constant voltage even when the battery is outputting a large current, can be preferably used.

Figures 4A, 4B, 4C, 4D:
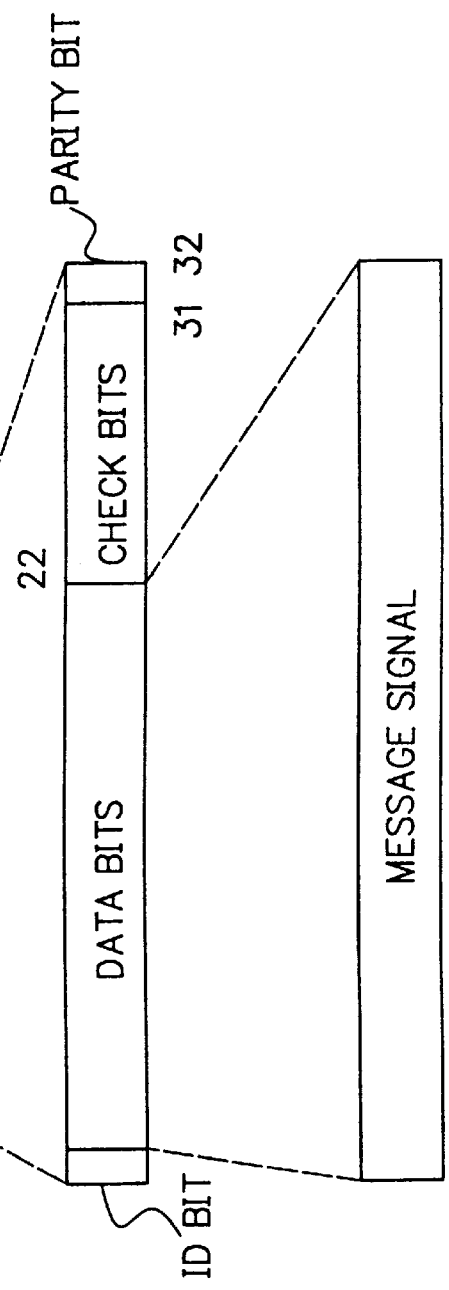
FIG. 4A through FIG. 4D are schematic diagrams showing an example of a signal format for calling pagers according to POCSAG.

FIG. 4A through FIG. 4D are schematic diagrams showing an example of a signal format for calling pagers according to POCSAG (Post Office Code Standardization Advisory Group) which is widely used by many of radio paging services. FIG. 4A is showing a radio calling signal according to POCSAG. The signal shown in FIG. 4A is including eight frames, i.e. F1 through F8. FIG. 4B is showing part of the frame F1 of the signal of FIG. 4A, corresponding to a calling to a pager. The part shown in FIG. 4B includes an ID bit, data bits, check bits, and a parity bit. The selective calling number (ID) of the pager or the message sent by the sender is included in the data bits. FIG. 4C and FIG. 4D are showing the contents of the data bits shown in FIG. 4B. Generally, the data bits are used to contain a message signal as shown in FIG. 4C, and in some cases, the data bits are used to contain an encrypting information signal and a message signal as shown in FIG. 4D. The receiver section 101 and the control section 102 in the pager of this embodiment can be designed to receive and handle such a radio calling signal as shown in FIG. 4A through FIG. 4D.

On the other hand, in the reply operation, a radio signal according to a signal format used by portable cellular phones is transmitted by the radio transmitter section 109 in order to establish communication with a radio paging service.

In other words, dialing tone signals for calling the pager of the sender of the message is transmitted by the radio transmitter section 109 according to a signal format used by portable cellular phones.

In the following, the operation of the pager of this embodiment will be described referring to FIG. 2. In step 11, the pager waits for calling to the pager itself. If a calling to the pager is received in the step 11, i.e. if a selective calling number (ID) in the received radio calling signal is identified by the control section 102 as the selective calling number of the pager itself, reception of the calling is informed to the user of the pager by the informing section 105 by means of ring tones, vibration, etc., and a message included in the received radio calling signal is extracted by the control section 102 and is displayed on the display section 104 such as a LCD, in the same way as ordinary pagers (step 12).

In step 13, the telephone number retrieval section 107 finds and extracts a telephone number or a sequence of numbers corresponding to part of a telephone number out of the received message. If the whole of a telephone number is extracted in the step 13, process proceeds to step 15. If a sequence of numbers corresponding to part of a telephone number is extracted in the step 13, process proceeds to step 14. And if no sequence of numbers corresponding to part of a telephone number is found in the step 13, process is returned to the step 11 and the pager waits for the next reception of a message.

In the step 14, the telephone number retrieval section 107 checks whether or not there is a telephone number stored in the telephone number memory 106 which includes the sequence of numbers extracted in the step S13. If a telephone number which includes the sequence of numbers is found, the telephone number retrieval section 107 determines that the found telephone number is the telephone number of the pager of the sender, and process proceeds to the step S15. For example, if a sequence of numbers '7890' is found in the step S13 and a telephone number '03-3456-7890 (an example in JAPAN)' stored in the telephone number memory 106 is found in the step S14, the telephone number retrieval section 107 determines that the telephone number of the pager of the sender is '03-3456-7890'. If no telephone number including the sequence of numbers is found in the step S14, process is returned to the step 11 and the pager waits for the next reception of a message.

More concretely, the extraction of the whole telephone number or a sequence of numbers corresponding to part of a telephone number in the step S13 can be executed according to the following methods.

In the case where the pager is designed to receive and display characters other than numbers, i.e. alphabets, symbols, etc., the telephone number retrieval section 107 extracts a sequence of numbers of a predetermined number of digits out of the received message, and determines that the sequence of numbers is the whole telephone number or part of the telephone number of the pager of the sender. For example, in Japan, a telephone number in the complete form starts from the number '0' such as '03-3456-7890', and the number of digits of a telephone number in the complete form is 9 or 10.

Therefore, the telephone number retrieval section 107 can execute the extraction of the whole telephone number by finding a sequence of numbers in 9 or 10 figures included in the received message. And especially in Japan etc., the telephone number retrieval section 107 can execute the extraction by finding a sequence of numbers in 9 or 10 figures which starts from the number '0'. On the other hand, part of a telephone number of the sender of the message is, in many cases, included in the message in the form of 4 figures, such as 'TOMORROW TENNIS 7890'. Therefore, the telephone number retrieval section 107 can execute extraction of part of the telephone number by finding a sequence of numbers in 4 figures.

To improve precision of the extraction, the whole telephone number or the sequence of numbers corresponding to the telephone number may be placed at a predetermined position in the message, such as the end of the message, and in such a case, the telephone number retrieval section 107 may execute the extraction by finding a sequence of numbers of a predetermined number of digits which is placed at the end of the received message.

In order to further improve the precision of the extraction, a telephone number flag such as 'TL' may be used in the message. For example, a message such as 'TOMORROW TENNIS TL0334567890' or 'TOMORROW TENNIS TL0334567890TL' can be used to show that the whole telephone number of the pager of the sender is '03-3456-7890', or a message such as 'TOMORROW TENNIS TL7890' or 'TOMORROW TENNIS TL7890TL' can be used to show that part of the telephone number is '7890', and the telephone number retrieval section 107 can execute the extraction by finding the telephone number flag 'TL' in the received message.

In the case where the pager is designed to receive and display numbers only, the above mentioned use of the telephone number flag such as '0000' is effective in order to execute precise extraction of the whole telephone number or a sequence of numbers corresponding to the telephone number. For example, a message such as '56423456000003345678900000' sent by such a numeric pager can be used to show that the whole telephone number of the pager of the sender is '03-3456-7890', or a message such as '5642345600007890' or '56423456000078900000' can be used to show that part of the telephone number is '7890', and the telephone number retrieval section 107 can execute the extraction by finding the telephone number flag '0000' in the received message.

Subsequently, the telephone number determined by the telephone number retrieval section 107 in the step S13 or the step S14 is supplied to the reply operation control section 108 and the reply operation control section 108 starts the reply operation. The radio transmitter control section 110 turns on power of the radio transmitter section 109 (step S15), and after the radio transmitter section 109 is activated and communication with the radio paging service is made possible, the radio transmitter control section 110 executes dialing to the telephone number which has been determined by the telephone number retrieval section 107. In the dialing, the aforementioned dialing tone signals for calling the pager of the sender of the message is transmitted by the radio transmitter section 109 according to a signal format used by portable cellular phones (step S16).

When the communication with the radio paging service is established, process proceeds to step S17. Then, a predetermined reply message is sent from the reply operation control section 108 to the radio transmitter control section 110, and operation for sending the predetermined reply message back to the sender is executed according to procedure which is suitable for the radio paging service. The predetermined message may be, for example, such a message as 'RECEIVED OK' (step S17). When the reply operation is completed, process proceeds to step 18 and the radio transmitter control section 110 disconnects power from the radio transmitter section 109.

As shown above, according to the first embodiment, when a message from a sender is received and a sequence of numbers corresponding to a telephone number or part of a telephone number is included in the message, it is possible to automatically send a predetermined reply message back to the sender without any operation by the user to the pager.

Figure 5:
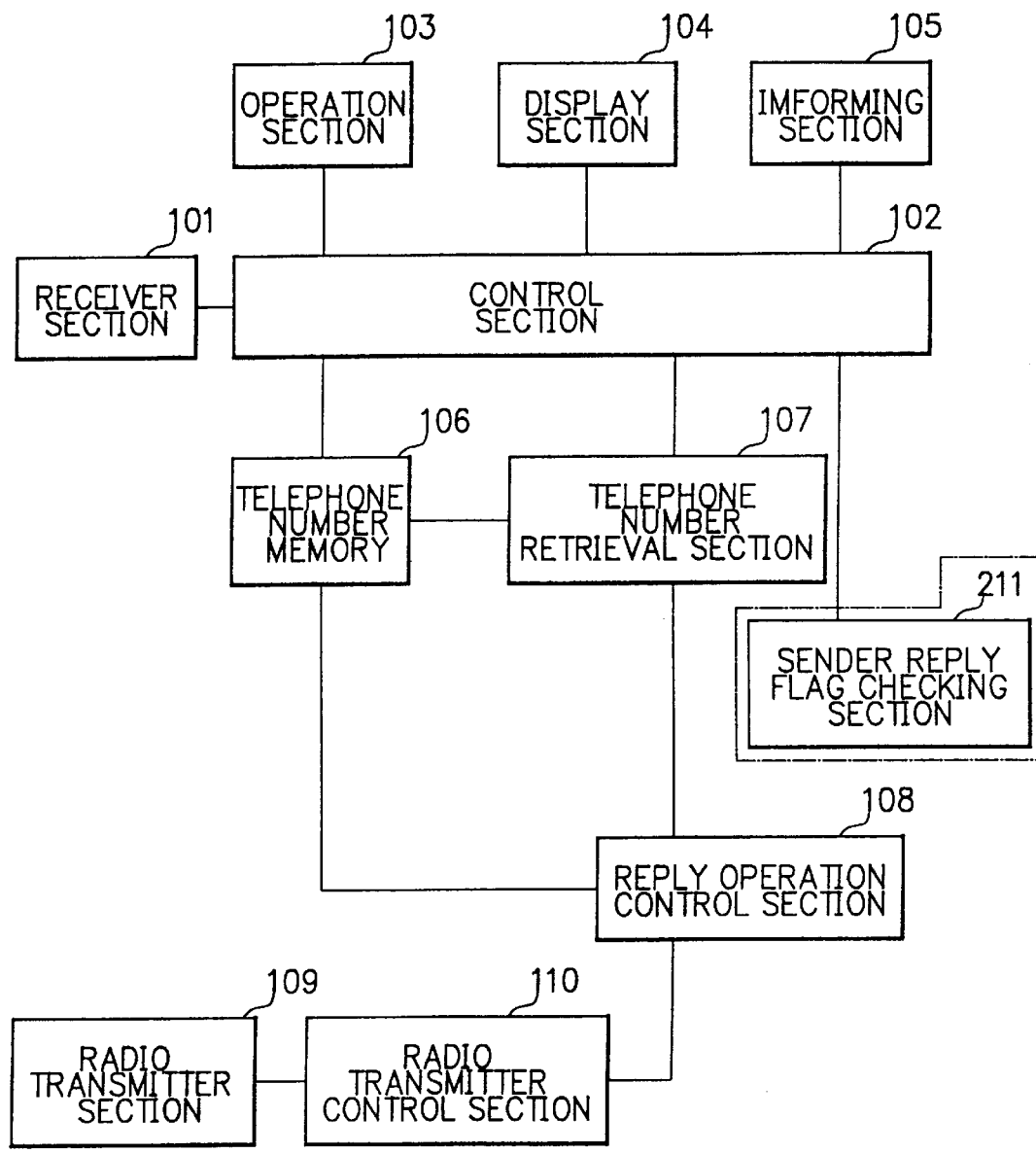
FIG. 5 is a block diagram showing functional blocks composing a pager according to the second embodiment of the present invention.
Figure 6:
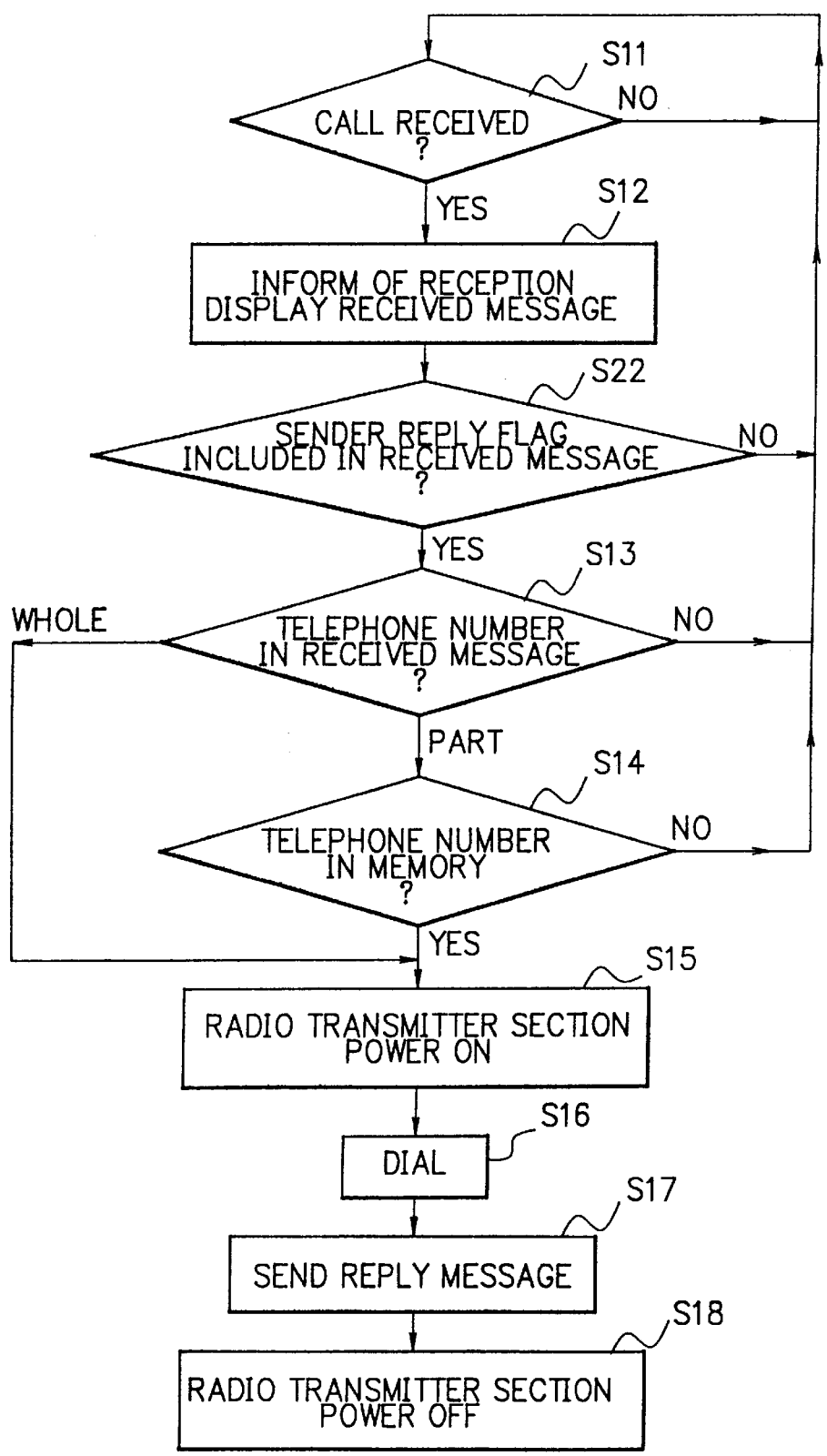
FIG. 6 is a flow chart showing steps involved in the operation of the pager of FIG. 5.

FIG. 5 is a block diagram showing functional blocks composing a pager according to the second embodiment of the present invention and FIG. 6 is a flow chart showing steps involved in the operation of the pager of FIG. 5. In the following, the difference from the first embodiment will be mainly described, and in the figures, the same reference characters as those of FIG. 1 or FIG. 2 designate the same or corresponding parts or steps to those of FIG. 1 or FIG. 2 and thus repeated description thereof is omitted for brevity.

Referring to FIG. 5, the pager further comprises a sender reply flag checking section 211 for checking whether or not a 'sender reply flag' is included in a received message. The sender reply flag checking section 211 can be realized, for example, by the same microcomputer unit as that for the control section 102 etc., and necessary software. The 'sender reply flag' in the second embodiment is a character (i. e. a letter, a symbol, etc.) or a sequence of characters which is included in a message inputted by the sender, for requesting the receiver to reply a message.

Referring to FIG. 6, the operation of the pager of FIG. 5 is almost the same as that of the first embodiment shown in FIG. 2, except that step S22 is executed between the step S12 and the step S13. After a message from a sender is received and displayed on the display section 104 (steps S11, S12), the sender reply flag checking section 211 checks whether or not the sender reply flag is included in the received message. If the sender reply flag is included, the determination of the telephone number and the reply operation are executed by the telephone number retrieval section 107, the reply operation control section 108, the radio transmitter section 109, and the radio transmitter control section 110, in the same way as the first embodiment. If the sender reply flag is not included, process is returned to the step 11 and the pager waits for the next reception of a message. For example, the sender reply flag can be decided to be letters 'RE' etc. in the end of messages. In such a case, if a received message is '0334567890RE', the determination of the telephone number and the reply operation are executed, and if a received message is '0334567890', the determination of the telephone number and the reply operation are not executed.

As shown above, according to the second embodiment, it is possible for the user to automatically send a predetermined reply message back to the sender of a message without any operation by the user to the pager, only in the case where the sender intended to receive a reply message from the recipient of the message.

Figure 7:
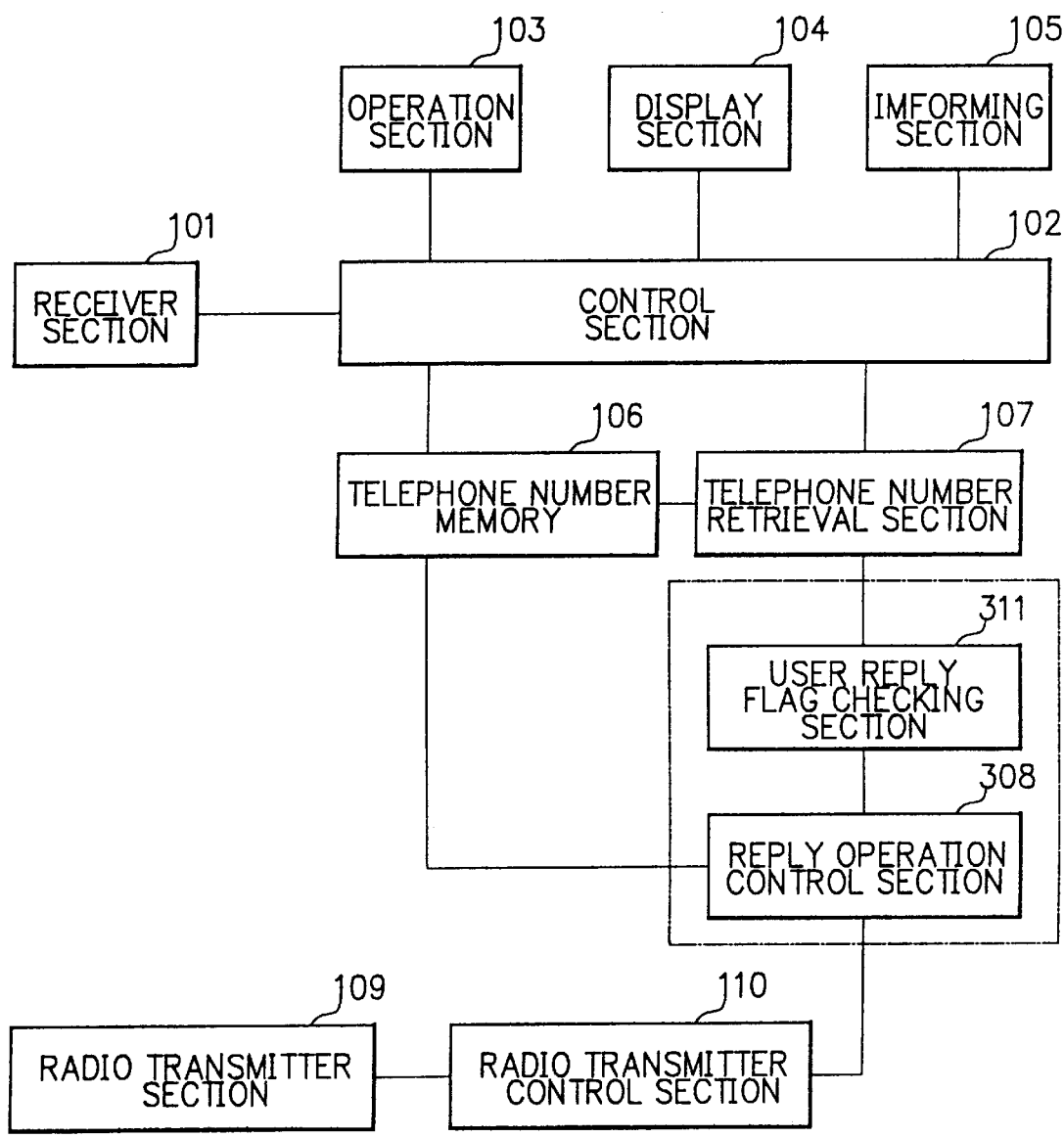
FIG. 7 is a block diagram showing functional blocks composing a pager according to the third embodiment of the present invention.
Figure 8:
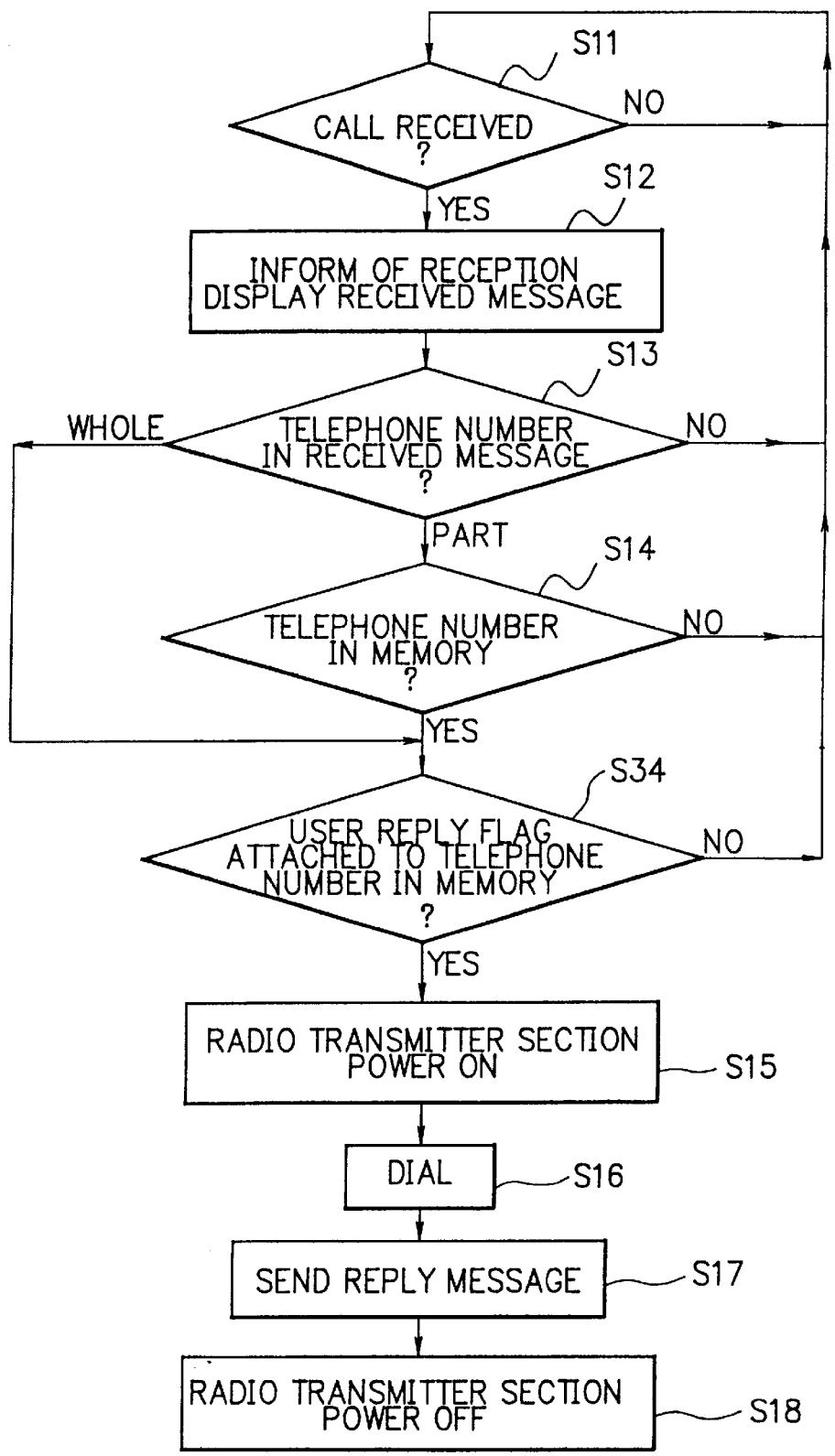
FIG. 8 is a flow chart showing steps involved in the operation of the pager of FIG. 7.

FIG. 7 is a block diagram showing functional blocks composing a pager according to the third embodiment of the present invention and FIG. 8 is a flow chart showing steps involved in the operation of the pager of FIG. 7.

Referring to FIG. 7, the pager comprises a user reply flag checking section 311 for checking whether or not a 'user reply flag' is attached to a telephone number is stored in the telephone number memory 106. The user reply flag checking section 311 can be realized, for example, by the same microcomputer unit as that for the control section 102 etc., and necessary software. The 'user reply flag' in the third embodiment is a character (i.e. a letter, a symbol, etc.) or a sequence of characters which is inputted by the user of the pager and attached to telephone numbers which are stored in the telephone number memory 106. Generally, the user inputs telephone numbers and other information into the telephone number memory 106 by operating the operation section 103. If the user intends to send a reply message to a particular sender of a message, the user inputs the user reply flag by operating the operation section 103 and the user reply flag is attached to a particular telephone number of a pager of the sender.

Referring to FIG. 8, the operation of the pager of FIG. 7 is almost the same as that of the first embodiment shown in FIG. 2, except that step S34 is executed between the step S14 and the step S15. After a message from a sender is received and displayed on the display section 104 (steps S11, S12) and the telephone number of the sender is determined by the telephone number retrieval section 107 (steps S13, S14), the user reply flag checking section 311 checks whether or not the user reply flag is attached to the telephone number which has been determined by the telephone number retrieval section 107, in the telephone number memory 106. If the user reply flag is attached to the telephone number, process proceeds to the step S15 and the telephone number is used by the reply operation control section 308 in the third embodiment, and reply operation is executed by the reply operation control section 308, the radio transmitter section 109, and the radio transmitter control section 110, in the same way as the first embodiment (steps S15, S16, S17, S18). If the user reply flag is not attached to the telephone number, process is returned to the step S11 and the pager waits for the next reception of a message.

As shown above, according to the third embodiment, it is possible for the user to automatically send a predetermined reply message back to particular senders to which the user intended to send beck the reply message.

Figure 9:
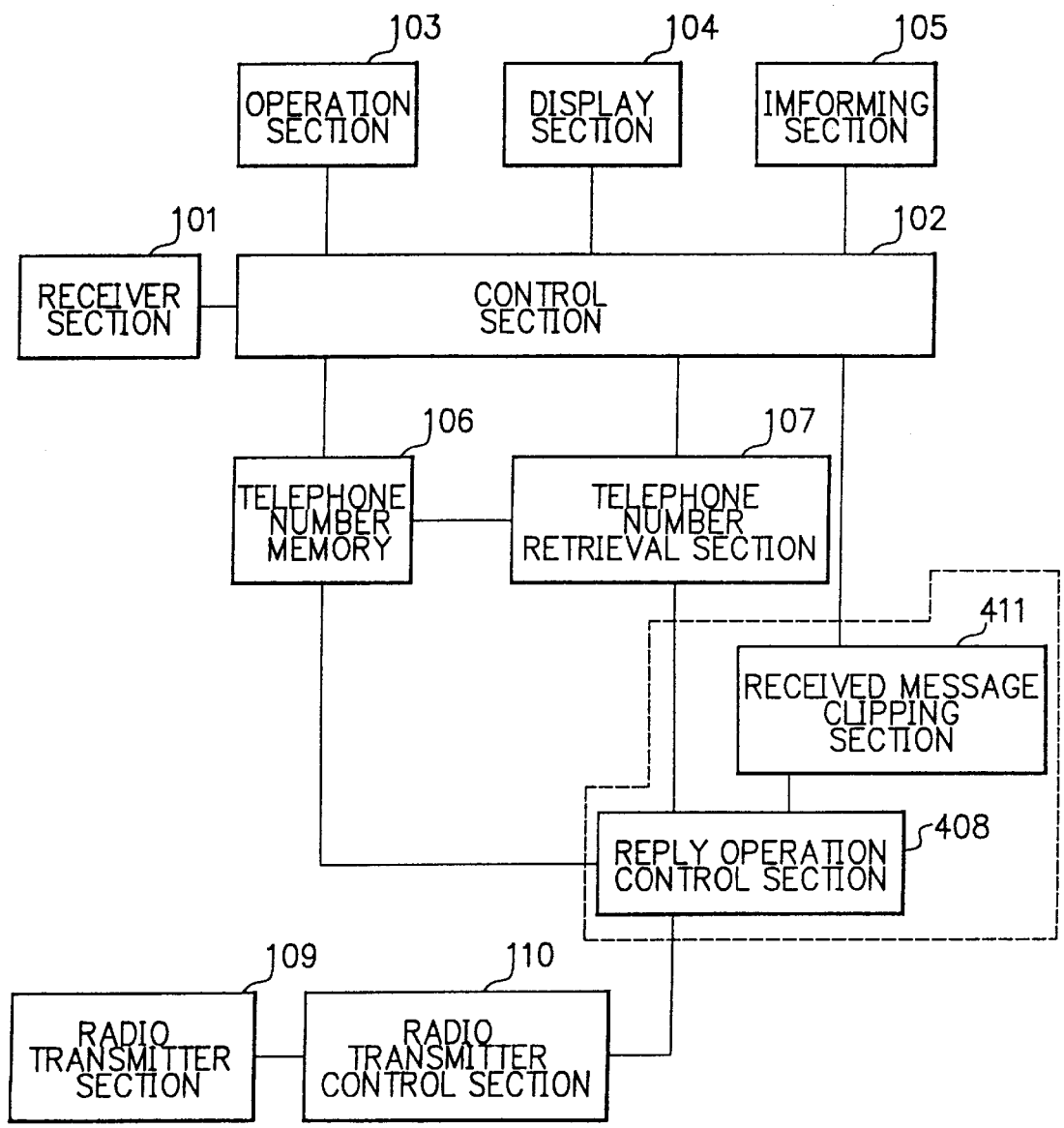
FIG. 9 is a block diagram showing functional blocks composing a pager according to the fourth embodiment of the present invention.
Figure 10:
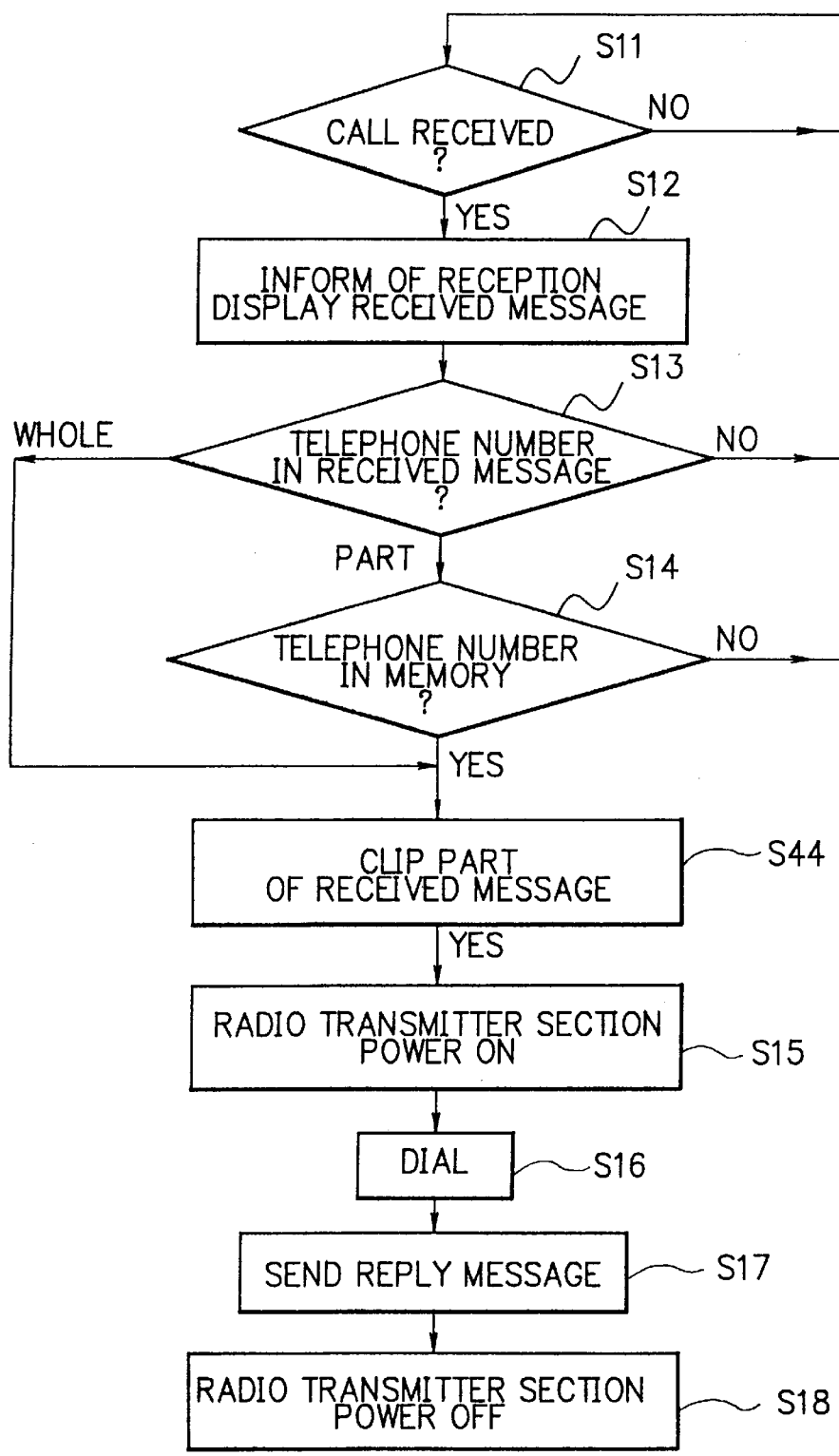
FIG. 10 is a flow chart showing steps involved in the operation of the pager of FIG. 9.

FIG. 9 is a block diagram showing functional blocks composing a pager according to the fourth embodiment of the present invention and FIG. 10 is a flow chart showing steps involved in the operation of the pager of FIG. 9.

Referring to FIG. 9, the pager comprises a received message clipping section 411 for clipping part of a received message out of the received message. The received message clipping section 411 can be realized, for example, by the same microcomputer unit as that for the control section 102 etc., and necessary software.

Referring to FIG. 10, the operation of the pager of FIG. 9 is almost the same as that of the first embodiment shown in FIG. 2, except that step S44 is executed between the step S14 and the step S15 and a reply message generated in the step S44 is used. After a message from a sender is received and displayed on the display section 104 (steps S11, S12) and the telephone number of the sender is determined by the telephone number retrieval section 107 (steps S13, S14), the received message clipping section 411 clips part of the received message of predetermined number of digits out of the received message, and generates a reply message using the part of the received message (step S44). For example, the reply message can be generated by adding a predetermined reply message, a predetermined symbol, and the part of the received message, together. In the case where the predetermined reply message is 'RECEIVED OK' and the predetermined symbol is '-' and the received message is 'TOMORROW TENNIS 7890' and the predetermined number of digits which is clipped by the received message clipping section 411 is ten, the reply message generated by the received message clipping section 411 can be 'RECEIVED OK-TOMORROW T' The reply message generated in the step S44 is used by the reply operation control section 408 in the fourth embodiment, and reply operation is executed by the reply operation control section 408, the radio transmitter section 109, and the radio transmitter control section 110, in the same way as the first embodiment (steps S15, S16, S17, S18).

As shown above, according to the fourth embodiment, it is possible for the user to automatically send a predetermined reply message and part of the received message together back to the sender without any operation by the user to the pager. Therefore, the sender can judge, to which message the reply message is sent back, by seeing the part of the reply message.

Figure 11:
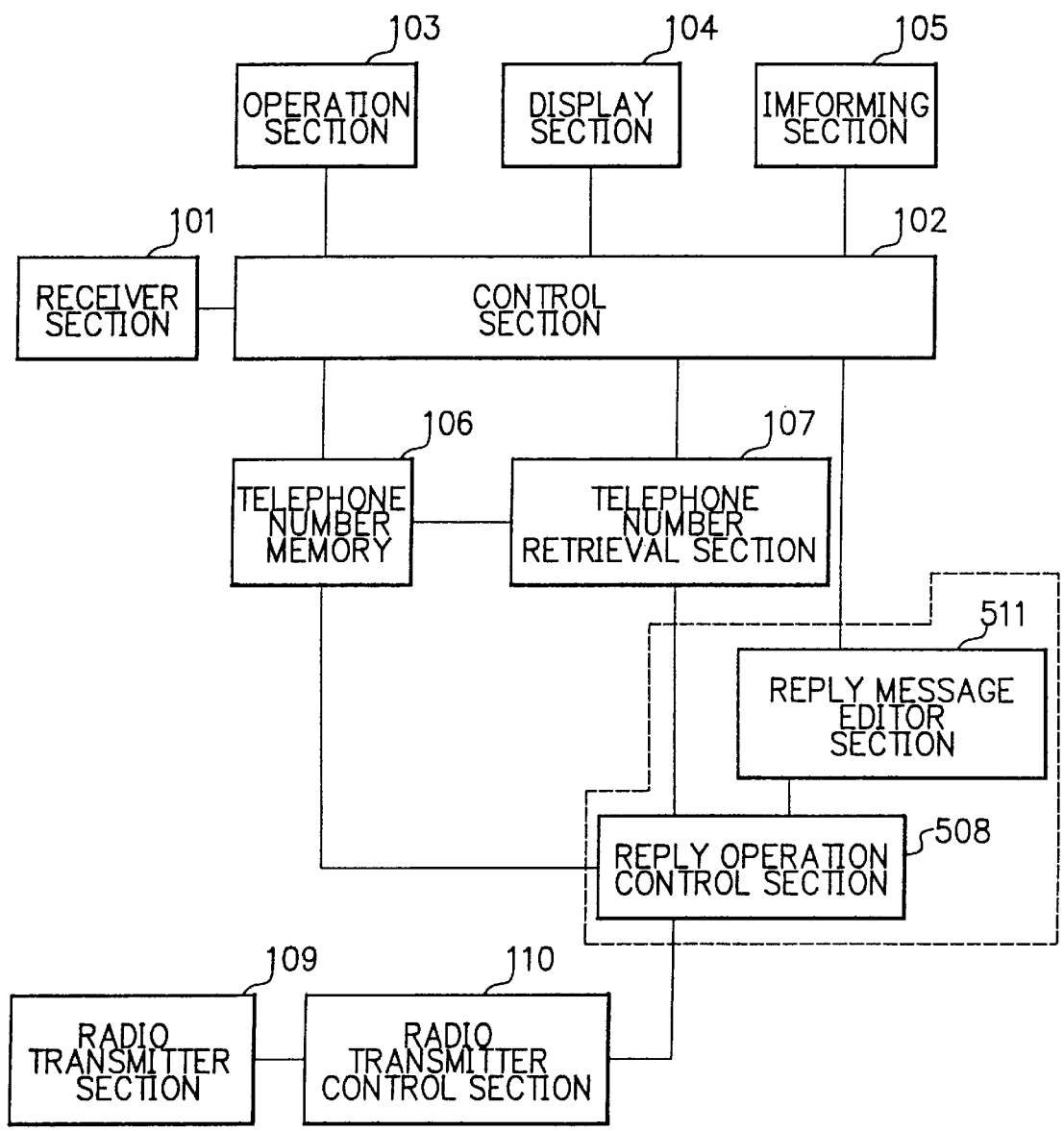
FIG. 11 is a block diagram showing functional blocks composing a pager according to the fifth embodiment of the present invention.
Figure 12:
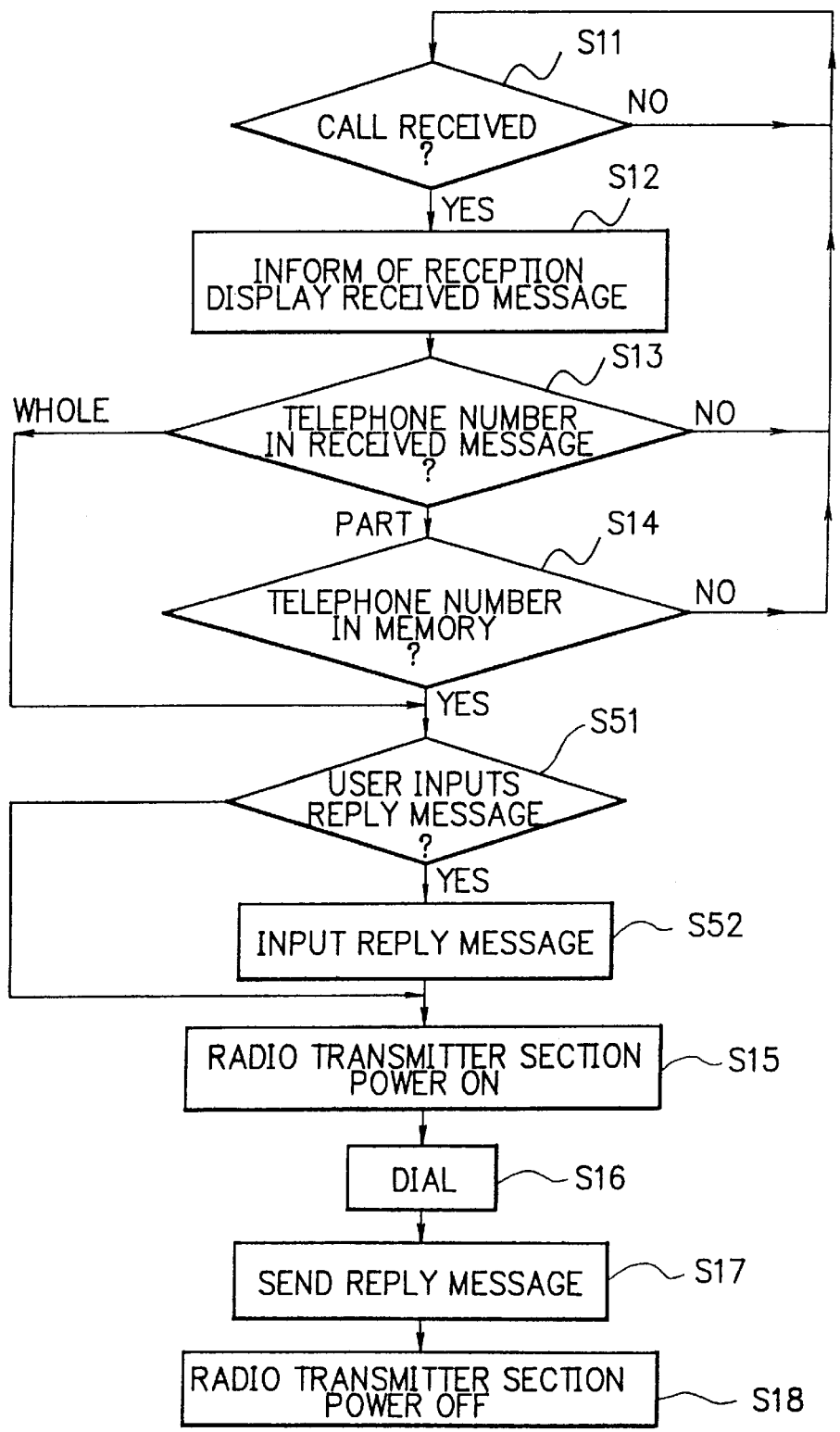
FIG. 12 is a flow chart showing steps involved in the operation of the pager of FIG. 11.

FIG. 11 is a block diagram showing functional blocks composing a pager according to the fifth embodiment of the present invention and FIG. 12 is a flow chart showing steps involved in the operation of the pager of FIG. 11.

Referring to FIG. 11, the pager comprises a reply message editor section 511. The reply message editor section 511 is used when the user of the pager inputs and edits a reply message which is composed by the user. The reply message editor section 511 can be realized, for example, by the same microcomputer unit as that for the control section 102 etc., and necessary software. The user composes a reply message and inputs the reply message operating the operation section 103, and necessary operation in the pager during the input of the reply message is executed by the reply message editor section 511.

Referring to FIG. 12, the operation of the pager of FIG. 11 is almost the same as that of the first embodiment shown in FIG. 2, except that steps S51 and S52 are executed between the step S14 and the step S15. After a message from a sender is received and displayed on the display section 104 (steps S11, S12) and the telephone number of the sender is determined by the telephone number retrieval section 107 (steps S13, S14), a question inquiring whether or not the user is going to input a reply message is displayed on the display section 104 and the user inputs the answer (step S51). If the answer of the user is YES, process proceeds to step S52 and the user inputs a reply message which the user composed, by operating the operation section 103 (step S52). Thereafter, the reply message inputted in the step S52 is used by the reply operation control section 508 in the fifth embodiment, and reply operation of the inputted reply message is executed by the reply operation control section 508, the radio transmitter section 109, and the radio transmitter control section 110, in the same way as the first embodiment (steps S15, S16, S17, S18). If the answer of the user is NO, process proceeds to the step S15 and thereafter, the aforementioned predetermined reply message is used by the reply operation control section 508, and reply operation of the predetermined reply message is executed by the reply operation control section 508, the radio transmitter section 109, and the radio transmitter control section 110, in the same way as the first embodiment (steps S15, S16, S17, S18).

As shown above, according to the fifth embodiment, it is possible for the user to send an arbitrary reply message back to the sender according to the contents of the received message. In the case where the predetermined reply message can be used, the user can send the predetermined reply message back to the sender.

As set forth hereinabove, by the pager and a method for operating a pager according to the present invention, it is possible to automatically send a reply message back to the sender of a message to the pager without complex operation by the user to the pager. Therefore it is possible to automatically let the sender know that the message has been received by the pager even in situations where dialing and talking are impossible, for example, during a meeting etc., and telephone charges needed for replying messages can be saved since the reply operation is executed accurately and quickly.

Further, the reply message can be automatically sent back to the sender only when the reply is necessary, by use of the sender reply flag or the user reply flag. Furthermore, by use of the received message clipping section 411, it is possible to automatically send a predetermined reply message and part of the received message together back to the sender, and give information about the sender of the reply message. Moreover, the user can also send an arbitrary reply message back to the sender according to the contents of the received message by use of the reply message editor section 511.

Incidentally, although the telephone number retrieval section 107 has been described to determine one telephone number in the step S14 in the embodiments shown above, it is possible for the telephone number retrieval section 107 to retrieve and select a plurality of telephone numbers which correspond to the sequence of numbers extracted in the step S13 out of the telephone number memory 106, and display the telephone numbers on the display section 104 to let the user select one telephone number corresponding to the received message. Further, it is needless to say that combination of the above embodiments is also possible.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A pager comprising:
   a receiver for receiving radio calling signals;
   an informing device for informing a user when the pager has received a radio calling signal;
   a display for displaying a received message which is extracted from the radio calling signal;
   a telephone number store for storing information including telephone numbers of other pagers which have been previously inputted by the user;
   a telephone number retrieval for retrieving a telephone number out of the telephone numbers which have been stored in the telephone number storing means, in response to a sequence of numbers which is included in the received message;
   a radio transmitter for executing radio transmission; and
   a reply operation control which automatically controls, without any operation by the user, transmission of a reply message to the telephone number which has been retrieved by the telephone number retrieval, using the radio transmitter.

2. A pager as claimed in claim 1, further comprising a sender reply flag check for checking whether or not a sender reply flag requesting the reply message is included in the received message, whereby the transmission of the reply message is executed if the sender reply flag is included in the received message.

3. A pager as claimed in claim 1, further comprising a user reply flag check for checking whether or not a user reply flag has been attached to the telephone number stored in the telephone number store, whereby the transmission of the reply message is executed if the user reply flag has been attached to the telephone number which has been retrieved by the telephone number retrieval.

4. A pager as claimed in claim 1, wherein a predetermined reply message is used as the reply message.

5. A pager as claimed in claim 1, further comprising a received message clipper for clipping part of the reply message out of the reply message, whereby the reply message is generated using the part of the reply message clipped by the received message clipper.

6. A pager as claimed in claim 1, further comprising a reply message editor for being used when the user inputs and edits a reply message, in which the reply message inputted by the user is transmitted if the reply message is inputted by the user.

7. A pager as claimed in claim 1, wherein the telephone number retrieval extracts a sequence of numbers of a predetermined number of digits out of the received message, and determines whether the sequence of numbers is the whole telephone number or part of the telephone number of the pager of the sender.

8. A pager as claimed in claim 7, wherein the telephone number retrieval executes the extraction of the sequence of numbers by finding a sequence of numbers of a predetermined number of digits which is placed at the end of the received message.

9. A method for operating a pager as claimed in claim 7, wherein the extraction of the sequence of numbers is executed by finding a sequence of numbers of a predetermined number of digits which is placed at the end of the received message.

10. A pager as claimed in claim 1, wherein the telephone number retrieval extracts a sequence of numbers which follows a telephone number flag out of the received message, and determines whether the sequence of numbers is the whole telephone number or part of the telephone number of the pager of the sender.

11. A pager as claimed in claim 1, wherein the telephone number retrieval extracts a sequence of numbers which is sandwiched between telephone number flags out of the received message, and determines whether the sequence of numbers is the whole telephone number or part of the telephone number of the pager of the sender.

12. A method for operating a pager as claimed in claim 1, further comprising the step of checking whether or not a sender reply flag requesting the reply message is included in the received message, in which the transmission of the reply message is executed if the sender reply flag is included in the received message.

13. A method for operating a pager as claimed in claim 1, further comprising the step of checking whether or not a user reply flag has been attached to the telephone number stored in the telephone number store, in which the transmission of the reply message is executed if the user reply flag has been attached to the telephone number which has been determined in step (2).

14. A method for operating a pager as claimed in claim 1, wherein a predetermined reply message is used as the reply message.

15. A method for operating a pager as claimed in claim 1, further comprising the step of clipping part of the reply message out of the reply message, in which the reply message is generated using the clipped part of the reply message.

16. A method for operating a pager as claimed in claim 1, further comprising the step of letting the user input and edit a reply message, in which the reply message inputted by the user has been transmitted if the reply message is inputted by the user.

17. A method for operating a pager as claimed in claim 1, wherein in step (2), a sequence of numbers of a predetermined number of digits is extracted out of the received message and it is determined whether the sequence of numbers is the whole telephone number or part of the telephone number of the pager of the sender.

18. A method for operating a pager as claimed in claim 1, wherein in step (2), a sequence of numbers which follows a telephone number flag is extracted out of the received message and it is determined whether the sequence of numbers is the whole telephone number or part of the telephone number of the pager of the sender.

19. A method for operating a pager as claimed in claim 1, wherein in step (2), a sequence of numbers which is sandwiched between telephone number flags is extracted out of the received message and it is determined whether the sequence of numbers is the whole telephone number or part of the telephone number of the pager of the sender.

20. A method for operating a pager comprising the steps of:

(a) receiving radio calling signals;

(b) informing the user when the pager has received a radio calling signal; and (c) displaying a received message which is extracted from the radio calling signal, wherein the method further comprises the steps of:

(1) storing information in a telephone number store, the information including telephone numbers of other pagers which have been previously inputted by the user;

(2) retrieving a telephone number out of the telephone numbers which have stored in the telephone number store, by a sequence of numbers which is included in the received message; and (3) automatically controlling, without any operation by the user, transmission of a reply message to the telephone number which has been retrieved in step (2), using a radio transmitter.

* * * * *